United States Patent
Hosking

(10) Patent No.: US 7,978,982 B2
(45) Date of Patent: Jul. 12, 2011

(54) ELECTRONIC DISPERSION COMPENSATION SYSTEMS AND METHODS

(75) Inventor: Lucy G. Hosking, Santa Cruz, CA (US)

(73) Assignee: Finisar Corporation, Sunnyvale, CA (US)

( * ) Notice: Subject to any disclaimer, the term of this patent is extended or adjusted under 35 U.S.C. 154(b) by 886 days.

(21) Appl. No.: 11/860,926

(22) Filed: Sep. 25, 2007

(65) Prior Publication Data

US 2008/0075202 A1 Mar. 27, 2008

Related U.S. Application Data

(60) Provisional application No. 60/827,191, filed on Sep. 27, 2006.

(51) Int. Cl.
*H04B 10/12* (2006.01)
(52) U.S. Cl. .......................... 398/147; 398/158; 398/159
(58) Field of Classification Search .................. 398/33, 398/136–138, 155, 158–159
See application file for complete search history.

(56) References Cited

U.S. PATENT DOCUMENTS

| | | | |
|---|---|---|---|
| 2004/0258183 A1* | 12/2004 | Popescu et al. | 375/350 |
| 2005/0111845 A1* | 5/2005 | Nelson et al. | 398/138 |
| 2005/0265653 A1* | 12/2005 | Cai et al. | 385/28 |
| 2006/0008279 A1* | 1/2006 | Chiang et al. | 398/202 |
| 2007/0009260 A1* | 1/2007 | Bothwell et al. | 398/33 |

OTHER PUBLICATIONS

U.S. Appl. No. 11/755,636, filed on May 30, 2007, McVey et al.

* cited by examiner

*Primary Examiner* — Dzung D Tran
(74) *Attorney, Agent, or Firm* — Maschoff Gilmore & Israelsen

(57) ABSTRACT

An electronic dispersion compensation (EDC) system may comprise one or more EDC solution application modules. The EDC system may include a solution transition module. The solution transition module may be configured to determine a path between a first EDC solution performed by a first EDC solution application module and a second EDC solution performed by a second EDC solution application module. The solution transition module may be configured to provide transition instructions to an EDC solution application module. The transition instructions may include one or more intermediate EDC solutions disposed along a path between a first EDC solution and a second EDC solution.

14 Claims, 5 Drawing Sheets

Multimode Fiber 100
(PRIOR ART)
*Figure 1*
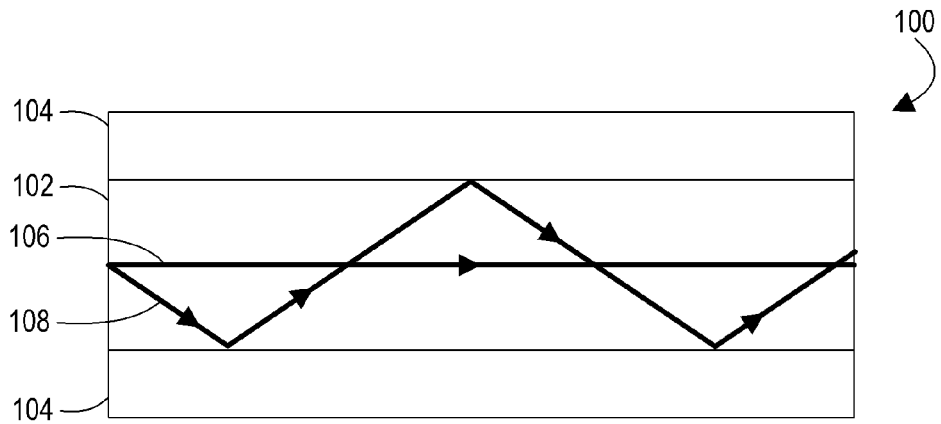
(PRIOR ART)
*Figure 2*
Single Mode Fiber 110
(PRIOR ART)
*Figure 3*
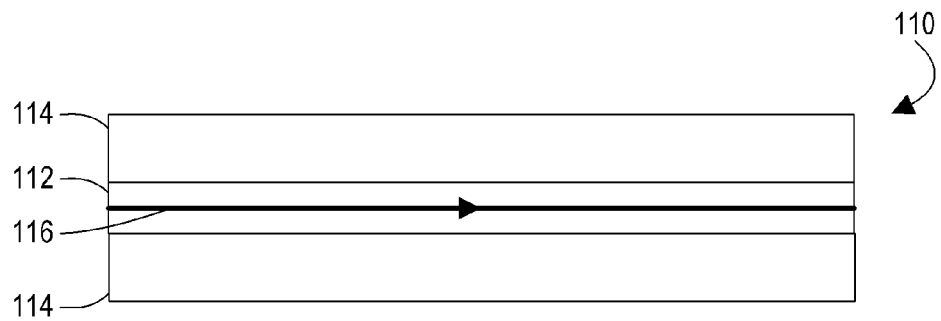
(PRIOR ART)
*Figure 4*

ELECTRONIC DISPERSION COMPENSATION SYSTEMS AND METHODS

CROSS-REFERENCE TO RELATED APPLICATIONS

This application claims priority to and the benefit of U.S. provisional patent application Ser. No. 60/827,191, which was filed on Sep. 27, 2006 and entitled ELECTRONIC DISPERSION COMPENSATION SYSTEMS AND METHODS, the disclosure of which is incorporated by reference in its entirety.

BACKGROUND

1. Field of the Invention

The invention generally relates to the transmission of signals in communication systems. More specifically, the invention relates to systems and methods of mitigating the effects of dispersion in communication systems.

2. Background Technology

In the field of data transmission, one method of efficiently transporting data is through the use of fiber-optics. Digital data is typically propagated through a fiber-optic cable using light emitting diodes or lasers. To send data on a fiber-optic cable, the data is typically converted from electronic data generated by computers to optical data that can be propagated onto the fiber-optic cable. This conversion is generally done using a laser or light emitting diode. When light is generated (or is at "high power") a logical "1" is presented. The absence of light (or light at "low power") represents a logical "0". Thus an optical signal with sharp rising transitions and falling transitions representing logical "1" and "0" bits is transmitted onto the fiber-optic cable.

Much of the fiber-optic cable presently installed is multi-mode fiber, such as a multi-mode fiber 100 shown in FIGS. 1 and 2. As shown in FIGS. 1 and 2, the multi-mode fiber 100 typically includes a core 102 surrounded by a cladding 104.

With multi-mode fiber, signals travel through different paths along the multi-mode fiber 100. For example, one or more portions 106 of a signal may travel directly down the multi-mode fiber 100 while other portions 108 of the signal "bounce" or are reflected back and forth along the fiber-optic cable. For portions of the signal that are reflected back and forth, each portion may take a different path resulting in different velocities at which the portions of the signal travel through the multi-mode fiber 100.

When a single signal takes several paths as it travels along the multi-mode fiber 100, the signal may disperse, which may cause portions of adjacent bits to disperse into each other (commonly referred to as "intersymbol interference"). For example, portions of a "1" or high power bit may spread into the time of the signal previously occupied by a "0" or low power bit. Similarly, the absence of power in a "0" or low power bit may cause a decrease in the power of an adjacent "1" or high power bit at various times within the time of the signal previously occupied by a "1" bit. Signal dispersion may be more severe as the distances that the signals travel is increased and also as the frequency at which the signals are transmitted increases.

As dispersion takes place, the high and low thresholds are blurred. The more blurring that takes place, the more difficult it is to interpret data bits. Consequently, some of the data bits embedded in the signals may be erroneously interpreted. While it is expected that some erroneous interpretations of data bits may occur, most communication standards specify a maximum number of erroneous interpretations that may occur. This is usually specified as the maximum bit error rate. For example, the maximum bit error rate in 10 Gigabit Ethernet systems is $10^{-12}$. To the extent that dispersion causes more errors than a specified maximum bit error rate, the effects of the dispersion should be mitigated.

One attempt to mitigate the effects of dispersion involves using single mode fiber, such as a single mode fiber 110 shown in FIGS. 3 and 4. As shown in FIGS. 3 and 4, the single mode fiber 110 typically includes a core 112 surrounded by a cladding 114. Advantageously, the single mode fiber 110 is configured to transmit a signal directly down the single mode fiber 110, which helps to mitigate the effects of dispersion. Unfortunately, installing single mode fiber may be more difficult, more time consuming, and/or more expensive than installing multi-mode fiber. Further, replacing existing multi-mode fiber with single mode fiber may also be difficult, expensive and time consuming. In addition, as speeds increase, the effects of dispersion may be noticed in single mode fiber, not just multi-mode fiber.

One attempt to mitigate the effects of dispersion involves using electronic dispersion compensation systems. Unfortunately, such systems may apply electronic dispersion compensation solutions that can get stuck in an undesirable local minimum.

Dispersion may occur in optical-based communication systems and also in other communication systems. For example, dispersion may occur in electrical based communication systems, such as those using copper or other conductor-based transmission lines.

SUMMARY

A need therefore exists for systems and methods that eliminate or diminish the disadvantages and problems listed above and/or other disadvantages and problems.

One aspect is an electronic dispersion compensation (EDC) system. The EDC system may comprise a first EDC solution application module, which may be configured to apply a first EDC solution to a first signal. The EDC system may also comprise a second EDC solution application module configured to apply a second EDC solution to the first signal. The EDC system may further comprise a solution transition module. The solution transition module may be configured to determine a path between the first EDC solution and the second EDC solution. The solution transition module may be configured to provide transition instructions to the first EDC solution application module. The transition instructions may include one or more intermediate EDC solutions disposed along the path between the first EDC solution and the second EDC solution.

Another aspect is an electronic dispersion compensation (EDC) system. The EDC system may comprise a first EDC solution application module, which may be configured to apply a first EDC solution to a first signal. The EDC system may also comprise a second EDC solution application module configured to apply a second EDC solution to the first signal. The EDC system may further comprise a solution transition module. The solution transition module may be configured to provide transition instructions to the first EDC solution application module. The transition instructions may include one or more intermediate EDC solutions disposed along a path between the first EDC solution and the second EDC solution.

For purposes of summarizing, some aspects, advantages and features of a few of the embodiments of the invention have been described in this summary. Some embodiments of the invention may include some or all of these summarized aspects, advantages and features. However, not necessarily all of (or any of) these summarized aspects, advantages or features will be embodied in any particular embodiment of the invention. Thus, none of these summarized aspects, advantages and features is essential. Some of these summarized aspects, advantages and features and other aspects, advantages and features may become more fully apparent from the following detailed description and the appended claims.

BRIEF DESCRIPTION OF THE DRAWINGS

The appended drawings contain figures of preferred embodiments to further clarify the above and other aspects, advantages and features of the present invention. It will be appreciated that these drawings depict only preferred embodiments of the invention and are not intended to limit its scope. Embodiments of the invention will be described and explained with additional specificity and detail through the use of the accompanying drawings in which:

FIG. 1 is a diagram of a prior art optical fiber;

FIG. 2 is a cross sectional diagram of the prior art optical fiber shown in FIG. 1;

FIG. 3 is a diagram of another prior art optical fiber;

FIG. 4 is a cross sectional diagram of the prior art optical fiber shown in FIG. 3;

DETAILED DESCRIPTION

Certain embodiments of the invention relate generally to electronic dispersion compensation systems and methods. However, the disclosed embodiments of systems and methods may be used in other contexts unrelated to electronic dispersion compensation.

Figure 5:
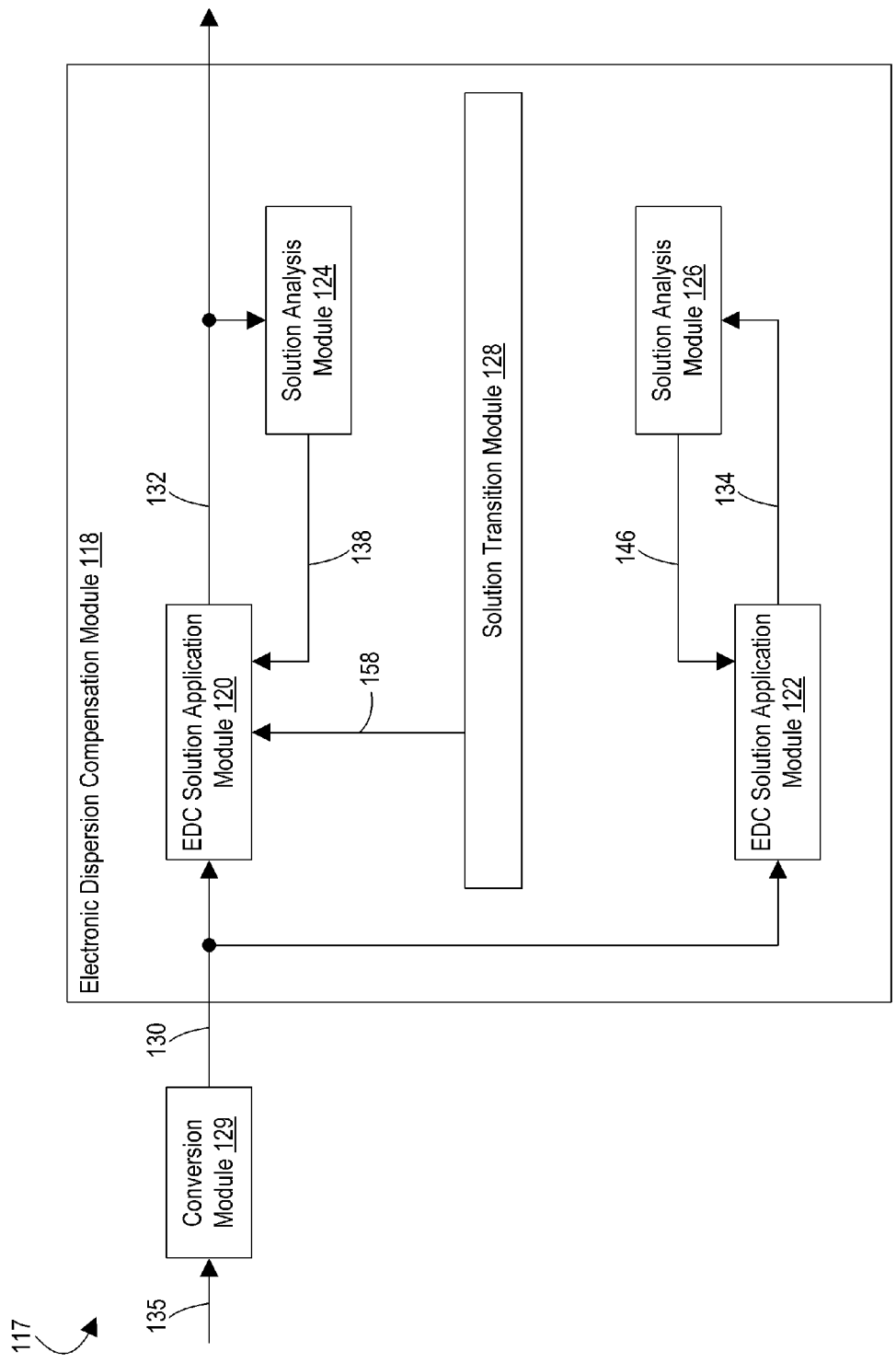
FIG. 5 is a diagram of an exemplary electronic dispersion compensation system.

Referring to FIG. 5, an electronic dispersion compensation system 117 may include an electronic dispersion compensation module 118. The electronic dispersion compensation module 118 may form part of a transceiver and/or other suitable network communications component. In addition, the electronic dispersion compensation module 118 may be embodied as part of a chip, a printed circuit board, and/or any other suitable structure.

The electronic dispersion compensation module 118 may include one or more electronic dispersion compensation (EDC) solution application modules 120, 122; one or more solution analysis modules 124, 126; a solution transition module 128; one or more other modules; or any one or more thereof. In addition, the electronic dispersion compensation system 117 and/or the electronic dispersion compensation module 118 may include a conversion module 129.

The electronic dispersion compensation module 118 may receive a signal 130 configured to transmit communication and may apply one or more electronic dispersion compensation solutions to the signal 130 to create a signal 132 configured to transmit the communication. For example, the EDC solution application module 120 may receive the signal 130 and may apply one or more electronic dispersion compensation solutions to the signal 130 to create the signal 132. The electronic dispersion compensation solutions that the EDC solution application module 120 applies to the signal 130 may advantageously help mitigate the effects of intersymbol interference.

As shown in FIG. 5, the EDC solution application module 122 may receive the signal 130 and may apply one or more electronic dispersion compensation solutions to the signal 130 to create a signal 134. As discussed in further detail below, this may help the EDC solution application module 122 explore various electronic dispersion compensation solutions to which the EDC solution application module 120 may later transition.

In some embodiments, the conversion module 129 may receive a signal 135, and the conversion module 129 may convert the signal 135 into the signal 130. For example, in one embodiment, the signal 135 may be an optical signal and the signal 130 may be an electronic signal, and the conversion module 135 may be configured to convert the optical signal 135 into the electronic signal 130. It will be appreciated, however, that the signals 130, 135 may be other types of signals. It will also be appreciated that the electronic dispersion compensation system 117 and the electronic dispersion compensation module 118 do not require any conversion module 129.

The EDC solution application modules 120, 122 may use any of a variety of EDC solutions. In some embodiments, EDC solutions may comprise selecting various views of a signal as the signal existed at different points in time and applying different processes to the views of the signal. For example, in some embodiments, EDC solutions as may comprise the selection of a combination of taps positioned in different locations along a communications medium and the application of different processes to the signal (such as the signal 130) received at those taps. The number of taps may be 2, 3, 4, 5, 6, 7, 8, 9, 10, 11, 12, 13, 14, 15 or more, if desired. Also for example, in some embodiments, EDC solutions may comprise selecting a series of delay lines, delay registers, and/or other structures that may receive various views of a signal from an individual location along a communications medium and applying different processes to the views of the signal. One exemplary process that may be applied to a view of a signal may include generating a secondary view from the original view. For example, the secondary view may be the same as the original view, may be the inverse of the original view, and/or any values between the original view or the inverse thereof. Of course, other exemplary processes may be used depending, for example, upon the particular EDC solution being applied.

The EDC solution application modules 120, 122 may use any of a variety of EDC solution-selection algorithms, including those already created and those that will be created in the future. Accordingly, it will be appreciated the EDC solution application modules 120, 122 do not require any particular EDC solution-selection algorithm. If desired, the EDC solution application modules 120, 122 may perform the same kind of EDC solution-selection algorithm or entirely different kinds of EDC solution-selection algorithms.

In some embodiments, the EDC solution application module 122 may use genetic algorithms to select EDC solutions. In some embodiments, the EDC solution application module 122 may use neural algorithms to select EDC solutions. In some embodiments, the EDC solution application module 122 may use an algorithm that comprises selecting an EDC solution from a library of EDC solutions.

Figure 6:
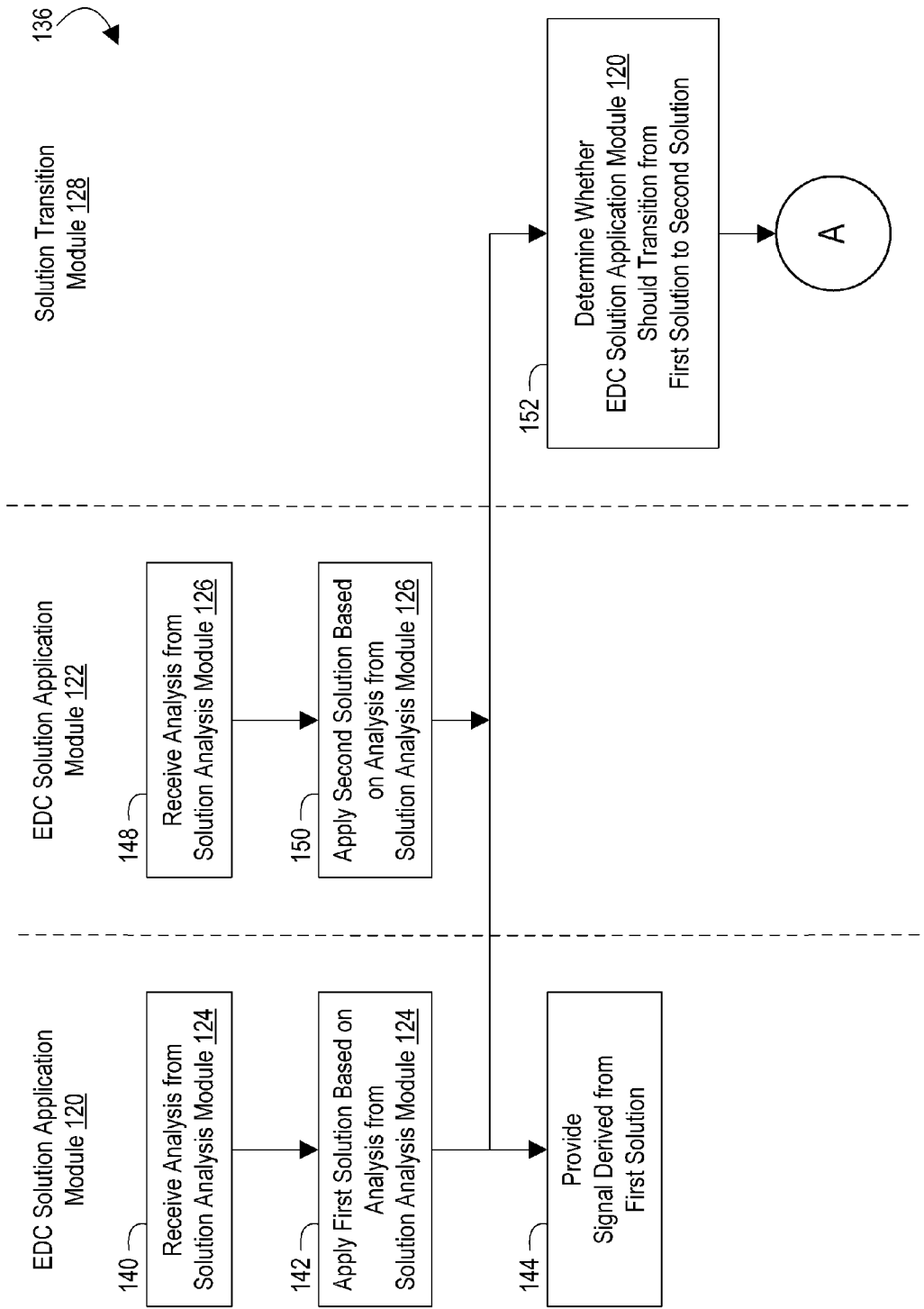
FIG. 6 is a flowchart of a portion of an exemplary electronic dispersion compensation method.

As shown in FIG. 6, the EDC solution application module 120, the EDC solution application module 122, and the solution transition module 128 may perform some or all of a method 136; however, some or all of the method 136 may be performed by the electronic dispersion compensation module 118; the EDC solution application module 120; the EDC solution application module 122; the solution transition module 128; one or more other suitable modules, systems, and the like; or any one or more thereof. Of course, the entire method 136 need not be performed; and any part or parts of the method 136 may be performed to provide a useful method 136.

As shown in FIG. 5, the solution analysis module 124 may analyze the solution applied by the EDC solution application module 120 using, for example, the signal 132, the signal 130, other signals, data indicating the solution applied by the EDC solution application module 120, other data, or any one or more thereof. The solution analysis module 124 may provide this analysis 138 (FIG. 5) to the EDC solution application module 120, which may receive the analysis 138 at a block 140 in FIG. 6. As shown in FIG. 6, at a block 142, the EDC solution application module 120 may apply a first solution based on the analysis 138. For example, in some embodiments, if the analysis 138 indicates that a currently applied solution produces a better result than a previously applied solution, the EDC solution application module 120 may continue to apply the currently applied solution; but if the analysis 138 indicates that the currently applied solution does not produce a better result than a previously applied solution, the EDC solution application module 120 may commence applying the previously applied solution. Of course, in some embodiments, if the analysis 138 indicates that the currently applied solution does not produce a better result than a previously applied solution, the EDC solution application module 120 may commence applying an entirely new solution that is different from both the currently applied solution and the previously applied solution. Consequently, the first solution applied at the block 142 may be the same as (or different from) a solution previously applied by the EDC solution application module 120 depending, for example, upon the contents of the analysis 138. At a block 144, the EDC solution application module 120 may provide a signal, such as the signal 132, which may be derived from applying the first solution to the signal 130. For example, the EDC solution application module 120 may provide the signal 132 to other circuitry or hardware to facilitate ongoing communication via the signal 132.

To apply a particular solution, the EDC solution application module 120 may adjust and/or combine one or more views of a signal as the signal existed at different points in time. (Such views may be obtained, for example, from a combination of taps positioned in different locations along a communications medium; from a series of delay lines, delay registers; other structures that may receive various views of a signal from an individual location along a communications medium; and/or from any other suitable means.) To adjust a particular view, the EDC solution application module 120 may generate an adjusted view from the particular view, which adjusted view may be, for example, any value between the particular view or the inverse thereof.

In some embodiments, to determine the extent, if any, to which this adjustment occurs, the EDC solution application module 120 may use accumulators associated with the views, which accumulators may be updated using the analysis 138. In further detail, an accumulator may be associated with a view and, preferably, each view may be associated with its own accumulator, if desired. At least partially based upon the analysis 138—which, as discussed above, may indicate whether a currently applied solution produces a better or worse result than a previously applied solution—the EDC solution application module 120 may update one or more of the accumulators, for example, by increasing or decreasing a value in such accumulators. The EDC solution application module 120 may then use the updated accumulators to determine whether the EDC solution application module 120 will change the solution it applies. In particular, the EDC solution application module 120 may, when the value in an accumulator reaches a particular threshold, change whether (and/or the extent to which) the EDC solution application module 120 adjusts the view associated with the accumulator and thus changes the solution applied by the EDC solution application module 120. In some instances, the threshold may be more quickly reached when the currently applied solution is much worse than the previously applied solution, but the threshold may be less quickly reached (or not reached at all) when the currently applied solution is only moderately worse than the previously applied solution. Of course, in some instances, the threshold may not be reached when the currently applied solution is as good as or better than the previously applied solution.

As shown in FIG. 5, the solution analysis module 126 may analyze the solution applied by the EDC solution application module 122 using, for example, the signal 130, the signal 134, other signals, data indicating the solution applied by the EDC solution application module 122, other data, or any one or more thereof. The solution analysis module 126 may provide this analysis 146 (FIG. 5) to the EDC solution application module 122, which may receive the analysis 146 at a block 148 in FIG. 6. As shown in FIG. 6, at a block 150, the EDC solution application module 122 may apply a second solution based on the analysis 146. For example, in some embodiments, if the analysis 146 indicates that a currently applied solution produces a better result than a previously applied solution, the EDC solution application module 122 may continue to apply the currently applied solution; but if the analysis 146 indicates that the currently applied solution does not produce a better result than a previously applied solution, the EDC solution application module 122 may commence applying the previously applied solution. Of course, in some embodiments, if the analysis 146 indicates that the currently applied solution does not produce a better result than a previously applied solution, the EDC solution application module 122 may commence applying an entirely new solution that is different from both the currently applied solution and the previously applied solution. Consequently, the second solution applied at the block 150 may be the same as (or different from) a solution previously applied by the EDC solution application module 122 depending, for example, upon the contents of the analysis 146.

As shown in FIG. 6, at a block 152, the solution transition module 128 may determine whether the EDC solution application module 120 should transition from applying the first solution (applied at the block 142 by the EDC solution application module 120) to the second solution (applied at the block 150 by the EDC solution application module 122). The solution transition module 128 may make this determination using, for example, the signal 130, the signal 132, the signal 134, other signals, data indicating the solution applied by the EDC solution application module 120, data indicating the solution applied by the EDC solution application module 122, other data, or any one or more thereof.

If, at the block 152, the solution transition module 128 determines that the EDC solution application module 120 should not transition from applying the first solution to the second solution, the method 136 may return to the blocks 140, 148. If, at the block 152, the solution transition module 128 determines that the EDC solution application module 120 should transition from applying the first solution to the second solution, the method 136 may proceed to a block 154. In one embodiment, to determine whether the EDC solution application module 120 should transition from the first solution to a second solution, the solution transition module 128 may compare mean squared errors associated with the solutions, bit error rates associated with the solutions, a threshold mean squared error, a threshold bit error rate, and/or use other calculations, factors or comparisons. In a further embodiment, the solution transition module 128 may be configured to consider how much the solutions differ, not merely whether they differ. Thus, in this embodiment, the solution transition module 128 may be configured to require a threshold amount of difference in order to determine that the transition between solutions should be made. Desirably, the amount of difference may vary depending upon the quality of first solution. For example, if the first solution has low quality, the solution transition module 128 may require a lower threshold amount of difference in order to determine that the transition between solutions should be made; but if the first solution has higher quality, the solution transition module 128 may require a larger threshold amount of difference in order to determine that the transition between solutions should be made. Of course, the solution transition module 128 need not be configured to require a threshold amount of difference.

At the block 154, the solution transition module 128 may determine a transition path, for example, between the first and second solutions. In some embodiments, the solution transition module 128 may determine a transition path using genetic algorithms. In some embodiments, the solution transition module 128 may determine a transition path using neural algorithms. In determining the transition path, the solution transition module 128 may consider whether any of the various solutions along a potential path exceed a means squared error threshold (which may be user-specified), a bit error rate threshold (which may be user-specified), and/or other suitable factors or calculations.

At a block 156, the solution transition module 128 may generate and/or send one or more transition instructions 158 (FIG. 5) to the EDC solution application module 120. At a block 160, the EDC solution application module 120 may receive the transition instructions 158. The EDC solution application module 120 may use the transition instructions 158 to perform the transition at a block 162. In one embodiment, the transition instructions 158 may comprise one or more intermediate EDC solutions disposed along the path between the first and second solutions, which the EDC solution application module 120 may apply to perform the transition from the first solution to the second solution. In some embodiments, these intermediate EDC solutions may advantageously be configured to allow the EDC solution application module 120 to perform the transition within predefined tolerances. Desirably, this may often allow the EDC solution application module 120 to perform the transition without disrupting ongoing communication via the signal 132. For example, these intermediate EDC solutions may advantageously be configured to allow the EDC solution application module 120 to perform the transition while remaining below a bit error rate associated with a particular communications protocol.

Figure 7:
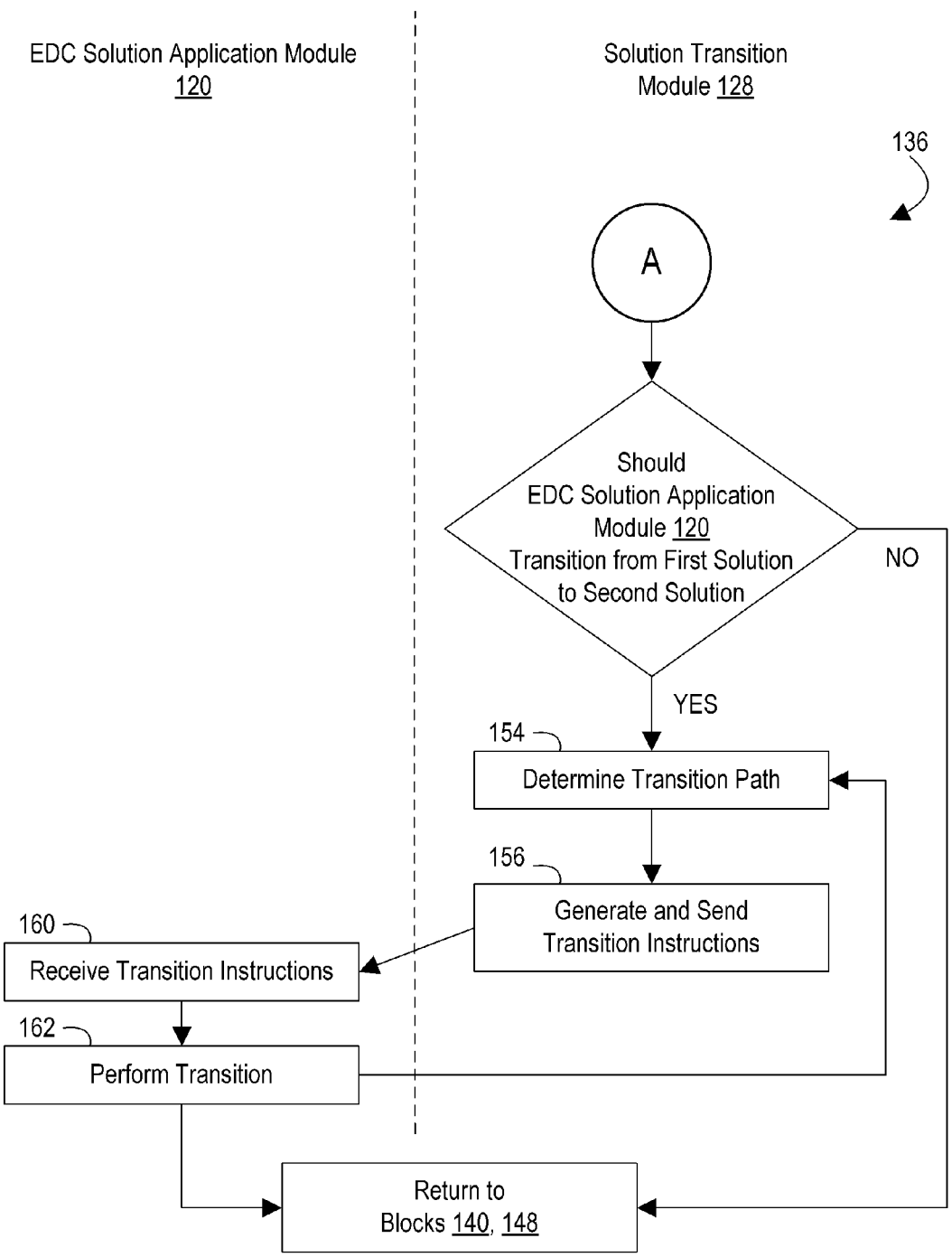
FIG. 7 is a flowchart of a portion of an exemplary electronic dispersion compensation method.

As shown in FIG. 7, the blocks 154, 156, 160, 162 may be repeated one or more times. In some embodiments, the solution transition module 128 may incrementally determine a plurality of transition paths, which may collectively extend between the first and second solutions. For example, the solution transition module 128 may determine a first path from the first solution to an intermediate solution and may generate and send transition instructions, which the EDC solution application module 120 may receive and use to perform the transition from the first solution to the intermediate solution. Afterwards, the solution transition module 128 may determine a second path from the intermediate solution to the second solution and may generate and send transition instructions, which the EDC solution application module 120 may receive and use to perform the transition from the intermediate solution to the second solution. Consequently, the generation and sending of transition instructions for transitioning between the first and second solutions need not be sent all at once, and the transition between the first and second solutions need not be performed all at once. Because there may be any number of such intermediate solutions, there may be any number of transition paths and therefore the blocks 154, 156, 160, 162 may be repeated any number of times. Of course, the blocks 154, 156, 160, 162 need not be repeated at all in some instances.

In some embodiments, to facilitate transition from a prior solution to a subsequent solution (e.g., from the first solution to an intermediate solution, from one intermediate solution to another intermediate solution, or from an intermediate solution to the second solution), the transition instructions 158 may indicate one or more biasing values configured to transition the EDC solution application module 120 from applying the prior solution to applying the subsequent solution. In further detail, as discussed above, the EDC solution application module 120 may use the analysis 138 to update accumulators associated with one or more views of a signal. In updating the accumulators, the EDC solution application module 120 may also use one or more biasing values. For instance, a biasing value may be associated with an accumulator and, preferably, each accumulator may be associated with its own biasing value, if desired. A biasing value may be configured to bias the value in an accumulator towards a particular threshold that causes the EDC solution application module 120 to adjust the view associated with the accumulator and thus causes the EDC solution application module 120 to change the solution it applies. Significantly, by biasing the values in the accumulators, the biasing values may be used to transition the EDC solution application module 120 from applying the prior solution to applying the subsequent solution.

Figure 8:
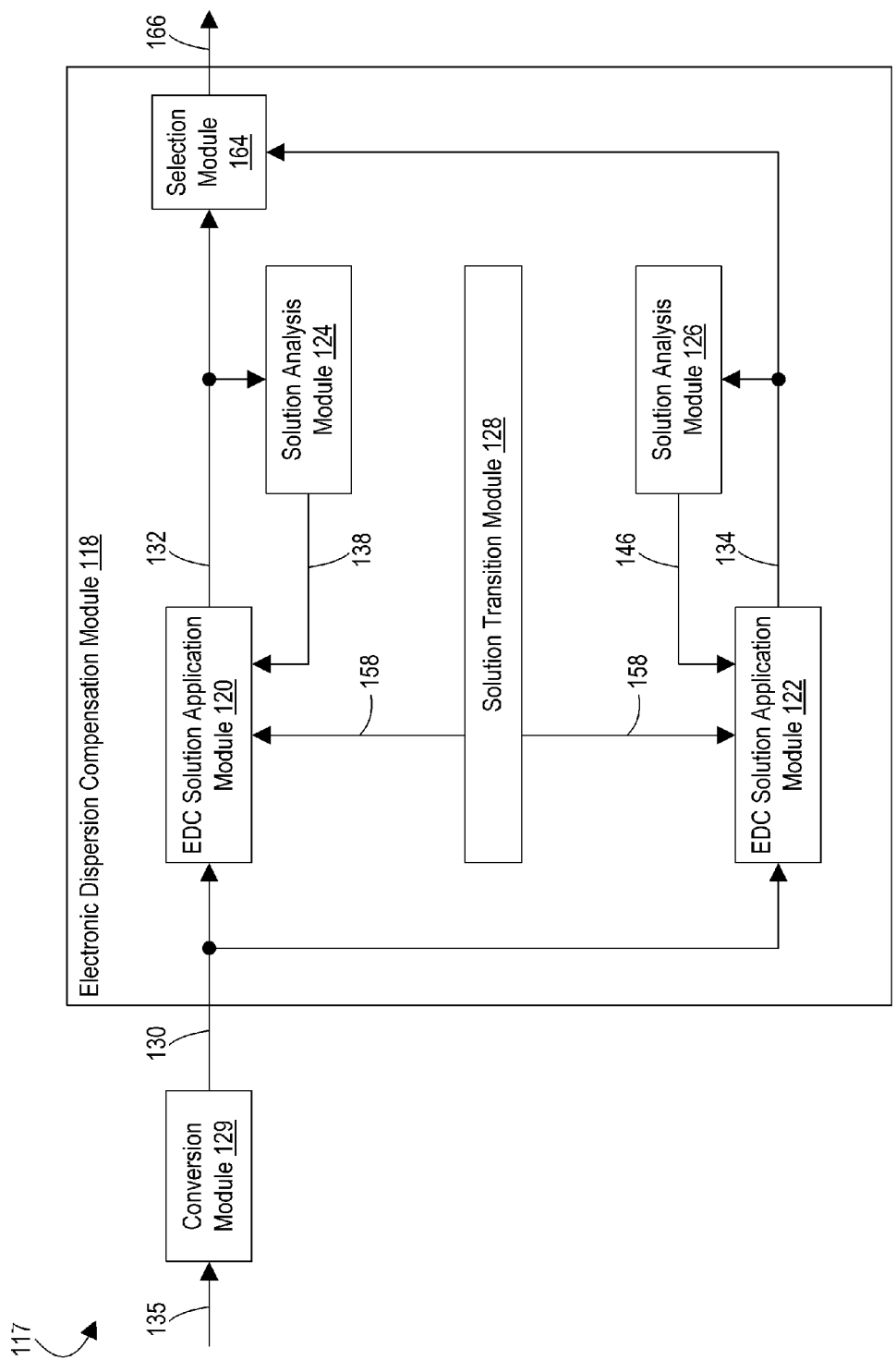
FIG. 8 is a diagram another exemplary electronic dispersion compensation system.

As shown in the exemplary embodiment of the electronic dispersion compensation system 117 shown in FIG. 8, an exemplary embodiment of the electronic dispersion compensation module 118 may include a selection module 164. The selection module 164 may be configured to select the signal 132 or the signal 134 and to provide a signal 166 that comprises the selected signal. The signal 166 may be provided to other circuitry or hardware to facilitate ongoing communication via the signal 166.

Desirably, this exemplary embodiment of the electronic dispersion compensation module 118 may be useful for choosing an initial EDC solution to provide the signal 166. For example, both of the EDC solution application modules 120, 122 may search for an initial EDC solution; and after an amount of time, the solution transition module 128 (or another suitable module) may identify which solution is preferred. After the preferred solution is identified, the EDC solution application module that found the preferred solution may continue to apply that solution (see, for example, blocks 140, 142), and the selection module 164 may select the signal generated by that solution. The other EDC solution application module may then search for other solutions (see, for example, blocks 148, 150). Searching for an initial EDC solution may occur, for example, when communication commences or when communication recommences after a break in communication. Desirably, the EDC solution application modules 120, 122 may be configured to search for an initial EDC solution while each other searches for an initial EDC solution.

In another embodiment, both of the EDC solution application modules 120, 122 shown in FIG. 5 may search for an initial EDC solution; and after an amount of time, the solution transition module 128 (or another suitable module) may identify which solution is preferred. After the preferred solution is identified, the EDC solution application module 120 shown in FIG. 5 may apply that solution and may provide the signal generated by that solution (see, for example, blocks 140, 142, 144). The EDC solution application module 122 shown in FIG. 5 may then search for other solutions (see, for example, blocks 148, 150).

Exemplary Environments

The methods and systems described above require no particular component or function. Thus, any described component or function—despite its advantages—is optional. Also, some or all of the described components and functions described above may be used in connection with any number of other suitable components and functions.

The methods and systems described above can be implemented using software, hardware, or both hardware and software. For example, the software may advantageously be configured to reside on an addressable storage medium and be configured to execute on one or more processors. Software, hardware, or both may include, by way of example, any suitable module, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays ("FPGA"), a field programmable logic arrays ("FPLAs"), a programmable logic array ("PLAs"), any programmable logic device, application-specific integrated circuits ("ASICs"), controllers, computers, and firmware to implement those methods and systems described above. The functionality provided for in the software, hardware, or both may be combined into fewer components or further separated into additional components. Additionally, the components may advantageously be implemented to form a part of and/or execute on one or more computing devices. As used herein, "computing device" is a broad term and is used in its ordinary meaning and includes, but is not limited to, devices such as, personal computers, desktop computers, laptop computers, palmtop computers, a general purpose computer, a special purpose computer, mobile telephones, personal digital assistants (PDAs), Internet terminals, multi-processor systems, hand-held computing devices, portable computing devices, microprocessor-based consumer electronics, programmable consumer electronics, network PCs, minicomputers, mainframe computers, computing devices that may generate data, computing devices that may have the need for storing data, and the like.

Also, one or more software modules, one or more hardware modules, or both may comprise a means for performing some or all of any of the methods described herein. Further, one or more software modules, one or more hardware modules, or both may comprise a means for implementing any other functionality or features described herein.

Embodiments within the scope of the present invention also include computer-readable media for carrying or having computer-executable instructions or data structures stored thereon. Such computer-readable media can be any available media that can be accessed by a computing device. By way of example, and not limitation, such computer-readable media can comprise any storage device or any other medium which can be used to carry or store desired program code means in the form of computer-executable instructions or data structures and which can be accessed by a computing device.

When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a computing device to perform a certain function or group of functions. Data structures include, for example, data frames, data packets, or other defined or formatted sets of data having fields that contain information that facilitates the performance of useful methods and operations. Computer-executable instructions and data structures can be stored or transmitted on computer-readable media, including the examples presented above.

Although this invention has been described in terms of certain preferred embodiments, other embodiments apparent to those of ordinary skill in the art are also within the scope of this invention. Indeed, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An electronic dispersion compensation (EDC) system comprising:

first EDC solution application module configured to apply a first EDC solution to a first signal, wherein the first EDC solution application module is configured to receive the first signal from a source and create a second signal after applying the first EDC solution to the first signal;

a second EDC solution application module configured to apply a second EDC solution to the first signal, wherein the second EDC solution application module is configured to receive the first signal from the source and create a third signal after applying the second EDC solution to the first signal, wherein the second EDC solution application module directly receives the first signal without also receiving at least a portion of the second signal; and a solution transition module, the solution transition module being configured to determine a path between the first EDC solution and the second EDC solution when it is determined that the second EDC solution produces a better electronic dispersion compensation result, the solution transition module being configured to provide transition instructions to the first EDC solution application module, the transition instructions including one or more intermediate EDC solutions disposed along the path between the first EDC solution and the second EDC solution.

2. The electronic dispersion compensation system as in claim 1, wherein the first EDC solution application module, the second EDC solution application module, and the solution transition module are embodied in a printed circuit board.

3. The electronic dispersion compensation system as in claim 1, wherein the first EDC solution application module, the second EDC solution application module, and the solution transition module are embodied in chip.

4. The electronic dispersion compensation system as in claim 1, wherein the first EDC solution application module, the second EDC solution application module, and the solution transition module are embodied in transceiver.

5. The electronic dispersion compensation system as in claim 1, wherein the second EDC solution application module is configured to perform an EDC solution selection algorithm, the EDC solution selection algorithm comprising at least one genetic algorithm.

6. The electronic dispersion compensation system as in claim 1, wherein the second EDC solution application module is configured to perform an EDC solution selection algorithm, the EDC solution selection algorithm comprising selecting an EDC solution from a library of EDC solutions.

7. The electronic dispersion compensation system as in claim 1, wherein the first EDC solution application module is configured to search for a first initial EDC solution, while the second EDC solution application module searches for a second initial EDC solution.

8. An electronic dispersion compensation (EDC) system comprising:
   a first EDC solution application module configured to apply a first EDC solution to a first signal wherein the first EDC solution application module is configured to receive the first signal from a source and create a second signal after applying the first EDC solution to the first signal;
   a second EDC solution application module configured to apply a second EDC solution to the first signal, wherein the second EDC solution application module is configured to receive the first signal from the source and create a third signal after applying the second EDC solution to the first signal, wherein the second EDC solution application module directly receives the first signal without also receiving at least a portion of the second signal; and
   a solution transition module, the solution transition module being configured to provide transition instructions to the first EDC solution application module, the transition instructions including one or more intermediate EDC solutions disposed along a path between the first EDC solution and the second EDC solution.

9. The electronic dispersion compensation system as in claim 8, wherein the first EDC solution application module, the second EDC solution application module, and the solution transition module are embodied in a printed circuit board.

10. The electronic dispersion compensation system as in claim 8, wherein the first EDC solution application module, the second EDC solution application module, and the solution transition module are embodied in chip.

11. The electronic dispersion compensation system as in claim 8, wherein the first EDC solution application module, the second EDC solution application module, and the solution transition module are embodied in transceiver.

12. The electronic dispersion compensation system as in claim 8, wherein the second EDC solution application module is configured to perform an EDC solution selection algorithm, the EDC solution selection algorithm comprising at least one genetic algorithm.

13. The electronic dispersion compensation system as in claim 8, wherein the second EDC solution application module is configured to perform an EDC solution selection algorithm, the EDC solution selection algorithm comprising selecting an EDC solution from a library of EDC solutions.

14. The electronic dispersion compensation system as in claim 8, wherein the first EDC solution application module is configured to search for a first initial EDC solution, while the second EDC solution application module searches for a second initial EDC solution.

\* \* \* \* \*